US012069655B2

(12) United States Patent
Zhang et al.

(10) Patent No.: US 12,069,655 B2
(45) Date of Patent: Aug. 20, 2024

(54) DOWNLINK DATA SCHEDULING HARQ-ACK CODEBOOK FEEDBACK AND GENERATION METHODS AND DEVICES, AND MEDIUM

(71) Applicant: BEIJING UNISOC COMMUNICATIONS TECHNOLOGY CO., LTD., Beijing (CN)

(72) Inventors: Sa Zhang, Shanghai (CN); Huan Zhou, Shanghai (CN); Xingya Shen, Shanghai (CN)

(73) Assignee: BEIJING UNISOC COMMUNICATIONS TECHNOLOGY CO., LTD., Beijing (CN)

( * ) Notice: Subject to any disclaimer, the term of this patent is extended or adjusted under 35 U.S.C. 154(b) by 537 days.

(21) Appl. No.: 17/419,247

(22) PCT Filed: Nov. 20, 2019

(86) PCT No.: PCT/CN2019/119625
§ 371 (c)(1),
(2) Date: Jun. 28, 2021

(87) PCT Pub. No.: WO2020/134725
PCT Pub. Date: Jul. 2, 2020

(65) Prior Publication Data
US 2022/0078827 A1    Mar. 10, 2022

(30) Foreign Application Priority Data

Dec. 29, 2018   (CN) .......................... 201811636464.6

(51) Int. Cl.
*H04W 72/1273*   (2023.01)
*H04L 1/00*   (2006.01)
(Continued)

(52) U.S. Cl.
CPC ....... *H04W 72/1273* (2013.01); *H04L 1/0027* (2013.01); *H04L 1/1607* (2013.01);
(Continued)

(58) Field of Classification Search
None
See application file for complete search history.

(56) References Cited

U.S. PATENT DOCUMENTS 10,484,149 B2   11/2019   Guan et al.
2018/0167173 A1   6/2018   Guan et al.
(Continued)

FOREIGN PATENT DOCUMENTS

CN    107332646 A    11/2017
CN    108292974 A    7/2018
(Continued)

OTHER PUBLICATIONS

3GPP. "Technical Specification Group Radio Access Network; Evolved Universal Terrestrial Radio Access (E-UTRA); Base Station (BS) radio transmission and reception (Release 13)" 3GPP TS 36.104 V13.5.0, Valbonne, France Sep. 30, 2016 (Sep. 30, 2016), sections 8.2 and 8.3 (207 pages).
(Continued)

*Primary Examiner* — Jay L Vogel
(74) *Attorney, Agent, or Firm* — Harness, Dickey & Pierce, P.L.C.

(57) ABSTRACT

Downlink data scheduling HARQ-ACK codebook feedback and generation methods and devices, and a medium are provided. The method comprises: determining whether a first HARQ-ACK codebook transmitted by a user terminal is detected; when the first HARQ-ACK codebook is not detected, delivering DCI for triggering retransmission of the first HARQ-ACK codebook to the user terminal, wherein the DCI for triggering retransmission of the first HARQ-
(Continued)

ACK codebook comprises a first trigger group number field, the first trigger group number field is the same as a first scheduling group number field, the first trigger group number field is used for indicating a number of the first trigger group, and the first scheduling group number field is used for indicating a number of the first scheduling group; and receiving the first HARQ-ACK codebook retransmitted by the user terminal. The solution can indicate HARQ-ACK codebook feedback of a discontinuous downlink data scheduling group.

12 Claims, 4 Drawing Sheets

(51) Int. Cl.
  *H04L 1/1607*  (2023.01)
  *H04L 1/1812*  (2023.01)
  *H04L 1/1829*  (2023.01)
  *H04L 1/1867*  (2023.01)
  *H04L 5/00*   (2006.01)
  *H04W 72/0446* (2023.01)
  *H04W 72/23*  (2023.01)

(52) U.S. Cl.
  CPC .......... *H04L 1/1685* (2013.01); *H04L 1/1812* (2013.01); *H04L 1/1854* (2013.01); *H04L 1/1858* (2013.01); *H04L 1/1896* (2013.01); *H04L 5/0053* (2013.01); *H04L 5/0055* (2013.01); *H04L 5/0091* (2013.01); *H04W 72/0446* (2013.01); *H04W 72/23* (2023.01)

(56) References Cited

U.S. PATENT DOCUMENTS

| | | |
|---|---|---|
| 2018/0241510 A1 | 8/2018 | Shen |
| 2019/0159251 A1 | 5/2019 | Li et al. |
| 2020/0106569 A1* | 4/2020 | Tsai ................ H04W 72/23 |
| 2020/0177352 A1* | 6/2020 | Peng ................ H04L 1/1864 |
| 2021/0242976 A1* | 8/2021 | Shi ................ H04L 1/1812 |
| 2021/0314102 A1* | 10/2021 | Li ................ H04L 1/1896 |

FOREIGN PATENT DOCUMENTS

| | | | |
|---|---|---|---|
| EP | 3297192 A1 | 3/2018 | |
| WO | WO-2017-024539 A1 | 2/2017 | |
| WO | WO-2017193890 A1 * | 11/2017 | ........ H04B 7/0482 |
| WO | WO-2018-016794 A1 | 1/2018 | |
| WO | WO-2018128493 A1 * | 7/2018 | ........ B41J 5/105 |
| WO | WO-2018-204491 A1 | 11/2018 | |
| WO | WO-2019160387 A1 * | 8/2019 | ........ H04L 1/08 |
| WO | WO-2019242527 A1 * | 12/2019 | |
| WO | WO-2020-134725 A1 | 7/2020 | |

OTHER PUBLICATIONS

Huawei. "HARQ enhancements in NR unlicensed" 3GPP TSG RAN WG1 Meeting #95 R1-1812196, Spokane, USA Nov. 16, 2018 (Nov. 16, 2018), entire document (13 pages).

VIVO. "Discussion on HARQ operation for NR-U" 3GPP TSG RAN WG1 Meeting #95 R1-1812302, Spokane, US Nov. 16, 2018 (Nov. 16, 2018), entire document (8 pages).

International Search Report (English and Chinese) and Written Opinion (Chinese) of the International Searching Authority issued in PCT/CN2019/119625, mailed Feb. 28, 2020; ISA/CN (8 pages).

* cited by examiner

DOWNLINK DATA SCHEDULING HARQ-ACK CODEBOOK FEEDBACK AND GENERATION METHODS AND DEVICES, AND MEDIUM

CROSS-REFERENCE TO RELATED APPLICATIONS

This application is a U.S. National Phase Application under 35 U.S.C. 371 of International Application No. PCT/CN2019/119625, filed on Nov. 20, 2019, which claims priority to Chinese Patent Application No. 201811636464.6, filed on Dec. 29, 2018, and entitled "DOWNLINK DATA SCHEDULING HARQ-ACK CODEBOOK FEEDBACK AND GENERATION METHODS AND DEVICES, AND MEDIUM". The entire disclosures of the above applications are expressly incorporated by reference herein.

TECHNICAL FIELD

The present disclosure generally relates to radio communication field, and more particularly, to downlink data scheduling HARQ-ACK codebook feedback and generation methods and devices, and a medium.

BACKGROUND

Hybrid Automatic Repeat reQuest (HARQ) is a technology that combines Forward Error Correction (FEC) and Automatic Repeat reQuest (ARQ) methods. By adding redundant information to the FEC, a receiver can correct some errors, thereby reducing retransmissions. For errors that cannot be corrected by the FEC, the receiver will request a sender to retransmit data through the ARQ mechanism. The receiver uses an error detection code, generally Cyclic Redundancy Check (CRC), to detect whether there is an error in a received data packet. If there is no error, the receiver sends a positive acknowledgement (ACK) to the sender. After receiving the ACK, the sender sends a next data packet. If there is an error, the receiver drops the data packet and sends a negative acknowledgement (NACK) to the sender. After receiving the NACK, the sender retransmits the same data packet.

New Radio Unlicensed (NR-U) bands support feedback of a HARQ-ACK codebook of downlink data in unlicensed bands. As Listen Before Talk (LBT) must be performed and successful before a channel is seized in the unlicensed bands, and then data can be sent, which makes a feedback time of the HARQ-ACK codebook of the downlink data uncertain.

To reduce a feedback delay of the HARQ-ACK codebook and reduce impact of LBT uncertainty, NR-U makes the HARQ-ACK codebook of the downlink data and the downlink data send in a same COT as much as possible (LBT does not need to be performed at this time). However, due to capability limitation in processing time of a UE, some downlink data cannot be fed back in the same COT. For these data, the HARQ-ACK codebook needs to be fed back in a COT different from that where the downlink data is transmitted.

In existing techniques, before obtaining the HARQ-ACK codebook of the downlink data, a base station may first group Downlink Control Information (DCI) used for downlink data scheduling, and each group corresponds to a number. A total number of groups is determined according to a total number of groups that need to perform HARQ-ACK codebook feedback. However, existing DCI can merely indicate N consecutive groups before a current group to perform HARQ-ACK codebook feedback.

SUMMARY

The existing DCI can merely indicate N consecutive groups before a current group to perform HARQ-ACK codebook feedback.

In an embodiment of the present disclosure, a downlink data scheduling HARQ-ACK codebook feedback method is provided, including: determining whether a first HARQ-ACK sub-codebook sent by a user terminal is detected, wherein the first HARQ-ACK sub-codebook is a feedback generated after the user terminal receives a first Physical Downlink Shared Channel (PDSCH) set, and the first PDSCH set is in a first scheduling group for scheduling the first PDSCH set; when the first HARQ-ACK sub-codebook is not detected, transmitting to the user terminal DCI for triggering retransmission of the first HARQ-ACK sub-codebook, wherein the DCI for triggering the retransmission of the first HARQ-ACK sub-codebook includes a first trigger group number field which is the same as a first scheduling group number field, the first trigger group number field is used to indicate a number of the first trigger group, and the first scheduling group number field is used to indicate a number of the first scheduling group; and receiving the first HARQ-ACK sub-codebook retransmitted by the user terminal.

Optionally, before determining whether a first HARQ-ACK sub-codebook sent by a user terminal is detected, the method further includes: transmitting to the user terminal DCI for scheduling the first PDSCH set, wherein the DCI for scheduling the first PDSCH set includes the first scheduling group number field.

Optionally, the DCI for scheduling the first PDSCH set further includes a first scheduling group Downlink Assignment Index (DAI) field and a second scheduling group DAI field, the first scheduling group DAI field is used to indicate C-DAI of the first scheduling group, and the second scheduling group DAI field is used to indicate T-DAI of the first scheduling group.

Optionally, the DCI for scheduling the first PDSCH set further includes other trigger group number field for indicating a number of other trigger group.

Optionally, when the DCI for scheduling the first PDSCH set includes the other trigger group number field, the first scheduling group DAI field is used to indicate a sum of the C-DAI of the first scheduling group and T-DAI of the other trigger group, and the second scheduling group DAI field is used to indicate a sum of the T-DAI of the first scheduling group and the T-DAI of the other trigger group.

Optionally, the method further includes: receiving a HARQ-ACK sub-codebook generated by the user terminal based on the other trigger group number field.

Optionally, the DCI for triggering the retransmission of the first HARQ-ACK sub-codebook further includes other scheduling group number field for indicating a number of a scheduling group where other scheduled PDSCH set is located.

Optionally, the DCI for triggering the retransmission of the first HARQ-ACK sub-codebook further includes a second trigger group DAI field for indicating T-DAI of the first trigger group.

Optionally, the DCI for triggering the retransmission of the first HARQ-ACK sub-codebook further includes a third trigger group DAI field for indicating a sum of T-DAI of all trigger groups in the DCI for triggering the retransmission of the first HARQ-ACK sub-codebook.

Optionally, the method further includes: receiving a HARQ-ACK sub-codebook generated by the user terminal based on the other scheduling group number field.

In an embodiment of the present disclosure, a HARQ-ACK codebook generation method is provided, including: receiving from a base station DCI for triggering retransmission of a first HARQ-ACK sub-codebook, wherein the DCI for triggering the retransmission of the first HARQ-ACK sub-codebook includes a first trigger group number field, the first trigger group number field is the same as a first scheduling group number field, the first trigger group number field is used to indicate a number of a first trigger group, and the first scheduling group number field is used to indicate a number of a first scheduling group, the first HARQ-ACK sub-codebook is a feedback generated after receiving a first PDSCH set which is in the first scheduling group; and based on the DCI for triggering the retransmission of the first HARQ-ACK sub-codebook, generating and transmitting the first HARQ-ACK sub-codebook to the base station.

Optionally, before receiving from the base station the DCI for triggering the retransmission of the first HARQ-ACK sub-codebook, the method further includes: receiving from the base station DCI for scheduling the first PDSCH set, wherein the DCI for scheduling the first PDSCH set includes the first scheduling group number field.

Optionally, the DCI for scheduling the first PDSCH set further includes a first scheduling group DAI field and a second scheduling group DAI field, the first scheduling group DAI field is used to indicate C-DAI of the first scheduling group, and the second scheduling group DAI field is used to indicate T-DAI of the first scheduling group.

Optionally, the DCI for scheduling the first PDSCH set further includes other trigger group number field for indicating a number of other trigger group.

Optionally, when the DCI for scheduling the first PDSCH set includes the other trigger group number field, the first scheduling group DAI field is used to indicate a sum of the C-DAI of the first scheduling group and T-DAI of the other trigger group, and the second scheduling group DAI field is used to indicate a sum of the T-DAI of the first scheduling group and the T-DAI of the other trigger group.

Optionally, the method further includes: generating and feeding back to the base station a HARQ-ACK sub-codebook corresponding to the other trigger group number field.

Optionally, the DCI for triggering the retransmission of the first HARQ-ACK sub-codebook further includes other scheduling group number field for indicating a number of a scheduling group where other scheduled PDSCH set is located.

Optionally, the DCI for triggering the retransmission of the first HARQ-ACK sub-codebook further includes a second trigger group DAI field for indicating T-DAI of the first trigger group.

Optionally, the DCI for triggering the retransmission of the first HARQ-ACK sub-codebook further includes a third trigger group DAI field for indicating a sum of T-DAI of all trigger groups in the DCI for triggering the retransmission of the first HARQ-ACK sub-codebook.

Optionally, when the DCI for triggering the retransmission of the first HARQ-ACK sub-codebook includes the other scheduling group number field, the method further includes: generating and feeding back to the base station a HARQ-ACK sub-codebook corresponding to the other scheduling group number field.

Optionally, the method further includes: when a plurality of HARQ-ACK sub-codebooks are transmitted to the base station at a same HARQ-ACK feedback time, sorting the plurality of HARQ-ACK sub-codebooks.

Optionally, sorting the plurality of HARQ-ACK sub-codebooks includes: sorting the plurality of HARQ-ACK sub-codebooks based on scheduling group numbers corresponding to the plurality of HARQ-ACK sub-codebooks; sorting the plurality of HARQ-ACK sub-codebooks based on scheduling time of PDSCH corresponding to the plurality of HARQ-ACK sub-codebooks; or sorting the plurality of HARQ-ACK sub-codebooks based on an order of C-DAI in DCI corresponding to the plurality of HARQ-ACK sub-codebooks.

In an embodiment of the present disclosure, a downlink data scheduling HARQ-ACK codebook feedback device is provided, including: a determining circuitry configured to determine whether a first HARQ-ACK sub-codebook sent by a user terminal is detected, wherein the first HARQ-ACK sub-codebook is a feedback generated after the user terminal receives a first PDSCH set, and the first PDSCH set is in a first scheduling group for scheduling the first PDSCH set; a first transmitting circuitry configured to: when the first HARQ-ACK sub-codebook is not detected, transmit to the user terminal DCI for triggering retransmission of the first HARQ-ACK sub-codebook, wherein the DCI for triggering the retransmission of the first HARQ-ACK sub-codebook includes a first trigger group number field which is the same as a first scheduling group number field, the first trigger group number field is used to indicate a number of the first trigger group, and the first scheduling group number field is used to indicate a number of the first scheduling group; and a first receiving circuitry configured to receive the first HARQ-ACK sub-codebook retransmitted by the user terminal.

Optionally, the device further includes a second transmitting circuitry configured to: before the determining circuitry determines whether the first HARQ-ACK sub-codebook sent by the user terminal is detected, transmit to the user terminal DCI for scheduling the first PDSCH set, wherein the DCI for scheduling the first PDSCH set includes the first scheduling group number field.

Optionally, the DCI for scheduling the first PDSCH set further includes a first scheduling group DAI field and a second scheduling group DAI field, the first scheduling group DAI field is used to indicate C-DAI of the first scheduling group, and the second scheduling group DAI field is used to indicate T-DAI of the first scheduling group.

Optionally, the DCI for scheduling the first PDSCH set further includes other trigger group number field for indicating a number of other trigger group.

Optionally, when the DCI for scheduling the first PDSCH set includes the other trigger group number field, the first scheduling group DAI field is used to indicate a sum of the C-DAI of the first scheduling group and T-DAI of the other trigger group, and the second scheduling group DAI field is used to indicate a sum of the T-DAI of the first scheduling group and the T-DAI of the other trigger group.

Optionally, the first receiving circuitry is further configured to receive a HARQ-ACK sub-codebook generated by the user terminal based on the other trigger group number field.

Optionally, the DCI for triggering the retransmission of the first HARQ-ACK sub-codebook further includes other scheduling group number field for indicating a number of a scheduling group where other scheduled PDSCH set is located.

Optionally, the DCI for triggering the retransmission of the first HARQ-ACK sub-codebook further includes a second trigger group DAI field for indicating T-DAI of the first trigger group.

Optionally, the DCI for triggering the retransmission of the first HARQ-ACK sub-codebook further includes a third trigger group DAI field for indicating a sum of T-DAI of all trigger groups in the DCI for triggering the retransmission of the first HARQ-ACK sub-codebook.

Optionally, the first receiving circuitry is further configured to receive a HARQ-ACK sub-codebook generated by the user terminal based on the other scheduling group number field.

In an embodiment of the present disclosure, a HARQ-ACK codebook generation device is provided, including: a second receiving circuitry configured to receive from a base station DCI for triggering retransmission of a first HARQ-ACK sub-codebook, wherein the DCI for triggering the retransmission of the first HARQ-ACK sub-codebook includes a first trigger group number field, the first trigger group number field is the same as a first scheduling group number field, the first trigger group number field is used to indicate a number of a first trigger group, and the first scheduling group number field is used to indicate a number of a first scheduling group, the first HARQ-ACK sub-codebook is a feedback generated after receiving a first PDSCH set which is in the first scheduling group; a generating circuitry configured to: based on the DCI for triggering the retransmission of the first HARQ-ACK sub-codebook, generate the first HARQ-ACK sub-codebook; and a third transmitting circuitry configured to transmit the first HARQ-ACK sub-codebook to the base station.

Optionally, the device further includes a third receiving circuitry configured to: before the second receiving circuitry receives from the base station the DCI for triggering the retransmission of the first HARQ-ACK sub-codebook, receive from the base station DCI for scheduling the first PDSCH set, wherein the DCI for scheduling the first PDSCH set includes the first scheduling group number field.

Optionally, the DCI for scheduling the first PDSCH set further includes a first scheduling group DAI field and a second scheduling group DAI field, the first scheduling group DAI field is used to indicate C-DAI of the first scheduling group, and the second scheduling group DAI field is used to indicate T-DAI of the first scheduling group.

Optionally, the DCI for scheduling the first PDSCH set further includes other trigger group number field for indicating a number of other trigger group.

Optionally, when the DCI for scheduling the first PDSCH set includes the other trigger group number field, the first scheduling group DAI field is used to indicate a sum of the C-DAI of the first scheduling group and T-DAI of the other trigger group, and the second scheduling group DAI field is used to indicate a sum of the T-DAI of the first scheduling group and the T-DAI of the other trigger group.

Optionally, the generating circuitry is further configured to: generate and feed back to the base station a HARQ-ACK sub-codebook corresponding to the other trigger group number field.

Optionally, the DCI for triggering the retransmission of the first HARQ-ACK sub-codebook further includes other scheduling group number field for indicating a number of a scheduling group where other scheduled PDSCH set is located.

Optionally, the DCI for triggering the retransmission of the first HARQ-ACK sub-codebook further includes a second trigger group DAI field for indicating T-DAI of the first trigger group.

Optionally, the DCI for triggering the retransmission of the first HARQ-ACK sub-codebook further includes a third trigger group DAI field for indicating a sum of T-DAI of all trigger groups in the DCI for triggering the retransmission of the first HARQ-ACK sub-codebook.

Optionally, the generating circuitry is further configured to: generate and feed back to the base station a HARQ-ACK sub-codebook corresponding to the other scheduling group number field.

Optionally, the device further includes a sorting circuitry configured to: when a plurality of HARQ-ACK sub-codebooks are transmitted to the base station at a same HARQ-ACK feedback time, sort the plurality of HARQ-ACK sub-codebooks.

Optionally, the sorting circuitry is configured to: sort the plurality of HARQ-ACK sub-codebooks based on scheduling group numbers corresponding to the plurality of HARQ-ACK sub-codebooks; sort the plurality of HARQ-ACK sub-codebooks based on scheduling time of PDSCH corresponding to the plurality of HARQ-ACK sub-codebooks; or sort the plurality of HARQ-ACK sub-codebooks based on an order of C-DAI in DCI corresponding to the plurality of HARQ-ACK sub-codebooks.

In an embodiment of the present disclosure, a non-volatile or nonstationary computer readable storage medium having computer instructions stored therein is provided, wherein when the computer instructions are executed, any one of the downlink data scheduling HARQ-ACK codebook feedback methods is performed.

In an embodiment of the present disclosure, a non-volatile or nonstationary computer readable storage medium having computer instructions stored therein is provided, wherein when the computer instructions are executed, any one of the HARQ-ACK codebook generation methods is performed.

In an embodiment of the present disclosure, a downlink data scheduling HARQ-ACK codebook feedback device including a memory and a processor is provided, wherein the memory has computer instructions stored therein, and when the processor executes the computer instructions, any one of the downlink data scheduling HARQ-ACK codebook feedback methods is performed.

In an embodiment of the present disclosure, a HARQ-ACK codebook generation device including a memory and a processor is provided, wherein the memory has computer instructions stored therein, and when the processor executes the computer instructions, any one of the HARQ-ACK codebook generation methods is performed.

Embodiments of the present disclosure may provide following advantages.

When the first HARQ-ACK sub-codebook is not detected, the DCI for triggering the retransmission of the first HARQ-ACK sub-codebook is transmitted to the user terminal. After receiving the DCI for triggering the retransmission of the first HARQ-ACK sub-codebook, the user terminal retransmits the first HARQ-ACK sub-codebook to the base station. The base station triggers the user terminal to retransmit the first HARQ-ACK sub-codebook only if the first HARQ-ACK sub-codebook is not detected. Therefore, downlink data scheduling group can be specifically instructed for HARQ-ACK sub-codebook re-feedback.

Further, when the base station transmits the DCI for triggering the retransmission of the first HARQ-ACK sub-codebook to the user terminal, other trigger group number field or other scheduling group number field may be configured, thereby indicating the user terminal to also transmit the HARQ-ACK sub-codebook indicated by the other trigger group number field or the HARQ-ACK sub-codebook indicated by the other scheduling group number field when the first HARQ-ACK sub-codebook is retransmitted.

DETAILED DESCRIPTION

In existing techniques, before obtaining the HARQ-ACK codebook of the downlink data, a base station may first group Downlink Control Information (DCI) used for downlink data scheduling, and each group corresponds to a number. A total number of groups is determined according to a total number of groups that need to perform HARQ-ACK codebook feedback. However, existing DCI can merely indicate N consecutive groups before a current group to perform HARQ-ACK codebook feedback.

In embodiments of the present disclosure, when the first HARQ-ACK sub-codebook is not detected, the DCI for triggering the retransmission of the first HARQ-ACK sub-codebook is transmitted to the user terminal. After receiving the DCI for triggering the retransmission of the first HARQ-ACK sub-codebook, the user terminal retransmits the first HARQ-ACK sub-codebook to the base station. The base station triggers the user terminal to retransmit the first HARQ-ACK sub-codebook only if the first HARQ-ACK sub-codebook is not detected. Therefore, the base station can specifically instruct a particular downlink data scheduling group before a current group to perform HARQ-ACK sub-codebook re-feedback, rather than merely indicating N consecutive downlink data scheduling groups before the current group to perform HARQ-ACK sub-codebook feedback simultaneously, thereby effectively reducing uplink control signaling overhead.

In order to clarify the objects, characteristics and advantages of the disclosure, embodiments of present disclosure will be described in detail in conjunction with accompanying drawings.

Figure 1:
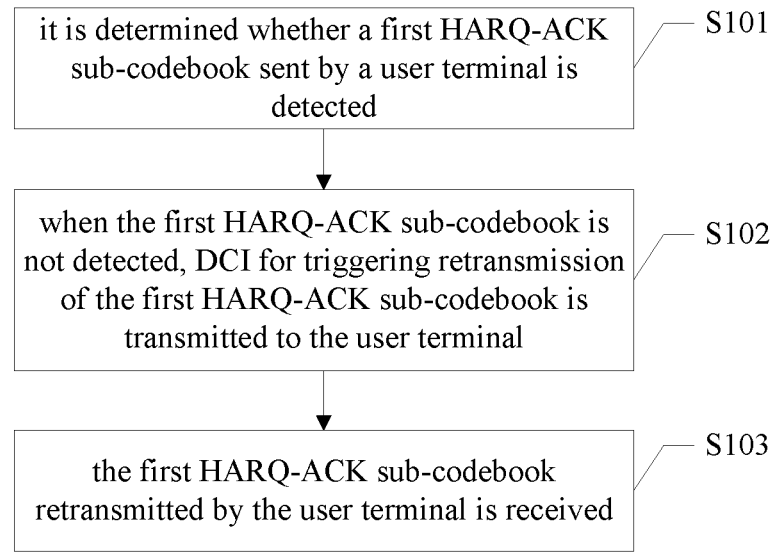
FIG. 1 is a flow chart of a downlink data scheduling HARQ-ACK codebook feedback method according to an embodiment.

Referring to FIG. 1, FIG. 1 is a flow chart of a downlink data scheduling HARQ-ACK codebook feedback method according to an embodiment. The method may include S101, S102 and S103.

In S101, it is determined whether a first HARQ-ACK sub-codebook sent by a user terminal is detected.

In some embodiments, a base station may send a first PDSCH set to the user terminal in advance. After receiving the first PDSCH set, the user terminal may generate the first HARQ-ACK sub-codebook corresponding to the first PDSCH set. Afterward, the user terminal may send the first HARQ-ACK sub-codebook to the base station.

In some embodiments, the first PDSCH set is in a first scheduling group for scheduling the first PDSCH set.

In some embodiments, before determining whether the first HARQ-ACK sub-codebook sent by the user terminal is detected, the base station may transmit to the user terminal DCI for scheduling the first PDSCH set, wherein the DCI for scheduling the first PDSCH set includes a first scheduling group number field and a value of K1. The first scheduling group number field is used to indicate a number of the first scheduling group, and the value of K1 is used to indicate in which slot the user terminal performs HARQ-ACK sub-codebook feedback.

For example, in the DCI for scheduling the first PDSCH set delivered by the base station in slot 0, the base station configures the first scheduling group number field to be 1, and K1=2. Then the user terminal should send the first HARQ-ACK sub-codebook corresponding to the first PDSCH set scheduled by group 1 (i.e., the first scheduling group) to the base station in slot 2.

However, in practice, the user terminal needs to perform a Listen Before Talk (LBT) operation first. After the LBT is successful, the user terminal sends the first HARQ-ACK sub-codebook to the base station. If the LBT fails, the user terminal cannot send the first HARQ-ACK sub-codebook to the base station. In this case, the base station also cannot detect the first HARQ-ACK sub-codebook sent by the user terminal.

In addition, even if the user terminal succeeds in the LBT and successfully sends the first HARQ-ACK sub-codebook to the base station, the base station may miss the detection, that is, the base station may not detect the first HARQ-ACK sub-codebook sent by the user terminal.

Therefore, in the embodiments of the present disclosure, the base station may first determine whether the first HARQ-ACK sub-codebook sent by the user terminal is detected. If the base station detects the first HARQ-ACK sub-codebook sent by the user terminal, the base station does not need to perform subsequent S102 and S103. On the contrary, if the base station does not detect the first HARQ-ACK sub-codebook sent by the user terminal, the base station needs to perform the subsequent S102 to S103.

In S102, when the first HARQ-ACK sub-codebook is not detected, DCI for triggering retransmission of the first HARQ-ACK sub-codebook is transmitted to the user terminal.

In some embodiments, when the first HARQ-ACK sub-codebook is not detected, the base station may configure the user terminal to retransmit the first HARQ-ACK sub-codebook. In some embodiments, the base station may transmit to the user terminal the DCI for triggering retransmission of the first HARQ-ACK sub-codebook.

In some embodiments, the DCI for triggering the retransmission of the first HARQ-ACK sub-codebook includes a first trigger group number field which may be the same as the first scheduling group number field, and the first trigger group number field is used to indicate a number of the first trigger group.

That is, in the embodiments of the present disclosure, if the base station does not detect the HARQ-ACK sub-codebook corresponding to the PDSCH set scheduled by a certain scheduling group, the base station may instruct the user terminal to retransmit the HARQ-ACK sub-codebook corresponding to the PDSCH set scheduled by the scheduling group.

For example, the HARQ-ACK sub-codebook corresponding to the first PDSCH set scheduled by the scheduling group 1 is the first HARQ-ACK sub-codebook. If the base station does not detect the first HARQ-ACK sub-codebook, the base station instructs the user terminal to retransmit the first HARQ-ACK sub-codebook.

After receiving the DCI issued by the base station for triggering the retransmission of the first HARQ-ACK sub-codebook, the user terminal may generate the first HARQ-ACK sub-codebook and send it to the base station accordingly.

In S103, the first HARQ-ACK sub-codebook retransmitted by the user terminal is received.

In some embodiments, the base station may receive the first HARQ-ACK sub-codebook retransmitted by the user terminal.

From above, in embodiments of the present disclosure, the base station can specifically instruct a particular downlink data scheduling group before a current group to perform HARQ-ACK sub-codebook re-feedback, rather than merely indicating N consecutive downlink data scheduling groups before the current group to perform HARQ-ACK sub-codebook feedback simultaneously, thereby effectively reducing uplink control signaling overhead.

In some embodiments, the DCI for scheduling the first PDSCH set further includes a first scheduling group DAI field and a second scheduling group DAI field. In some embodiments, the first scheduling group DAI field is used to indicate Counter Downlink Assignment Index (C-DAI) of the first scheduling group, and the second scheduling group DAI field is used to indicate Total DAI (T-DAI) of the first scheduling group.

In some embodiments, the DCI for scheduling the first PDSCH set further includes other trigger group number field for indicating a number of other trigger group. That is, after receiving the DCI for scheduling the first PDSCH set, the user terminal may obtain the first scheduling group number field and other trigger group number field therefrom. The user terminal may generate HARQ-ACK sub-codebooks corresponding to other trigger group number field based on the other trigger group number field.

For example, in the DCI for scheduling the first PDSCH set, the first scheduling group number field is 1, and the second trigger group number field is 2. The second trigger group number field is the same as the second scheduling group number field, and the second scheduling group number field is used to indicate a second scheduling group for scheduling a second PDSCH set, and the HARQ-ACK sub-codebook corresponding to the second PDSCH set is the second HARQ-ACK sub-codebook. Therefore, after receiving the DCI for scheduling the first PDSCH set, the user terminal retransmits the first HARQ-ACK sub-codebook and the second HARQ-ACK sub-codebook to the base station.

In some embodiments, when the DCI for scheduling the first PDSCH set includes the other trigger group number field, the first scheduling group DAI field is used to indicate a sum of the C-DAI of the first scheduling group and T-DAI of the other trigger group, and the second scheduling group DAI field is used to indicate a sum of the T-DAI of the first scheduling group and the T-DAI of the other trigger group.

In some embodiments, the DCI for triggering the retransmission of the first HARQ-ACK sub-codebook further includes other scheduling group number field for indicating a number of a scheduling group where other scheduled PDSCH set is located.

That is, after receiving the DCI for triggering the retransmission of the first HARQ-ACK sub-codebook, the user terminal may obtain the first trigger group number field and other scheduling group number field therefrom, and respectively for the first trigger group number field and other scheduling group number field, retransmit the first HARQ-ACK sub-codebook and the HARQ-ACK sub-codebook corresponding to the other scheduling group number field.

For example, in the DCI for triggering the retransmission of the first HARQ-ACK sub-codebook, the first trigger group number field is 1, and the second scheduling group number field is 2. The second scheduling group number field is used to indicate the number of the second scheduling group for scheduling the second PDSCH set, and the HARQ-ACK sub-codebook corresponding to the second PDSCH set is the second HARQ-ACK sub-codebook.

Therefore, after receiving the DCI for triggering the retransmission of the first HARQ-ACK sub-codebook, the user terminal retransmits the first HARQ-ACK sub-codebook to the base station and simultaneously transmits the second HARQ-ACK sub-codebook to the base station.

In some embodiments, the DCI for triggering the retransmission of the first HARQ-ACK sub-codebook further includes a second trigger group DAI field for indicating T-DAI of the first trigger group. The DCI for triggering the retransmission of the first HARQ-ACK sub-codebook may further include a third trigger group DAI field for indicating a sum of T-DAI of all trigger groups in the DCI for triggering the retransmission of the first HARQ-ACK sub-codebook.

From above, in embodiments of the present disclosure, the DCI issued by the base station for triggering the retransmission of the first HARQ-ACK sub-codebook may only be used for triggering the user terminal to retransmit the first HARQ-ACK sub-codebook. When the DCI of the user terminal for triggering the retransmission of the first HARQ-ACK sub-codebook further includes other scheduling group number field, the user terminal may also be triggered to send HARQ-ACK sub-codebook corresponding to the other scheduling group number field.

Accordingly, the DCI issued by the base station for scheduling the first PDSCH set may only be used for scheduling the user terminal to send the first HARQ-ACK sub-codebook. When the DCI for scheduling the first PDSCH set further includes the other trigger group number field, the user terminal may also be triggered to retransmit the HARQ-ACK sub-codebook corresponding to the other trigger group number field.

Therefore, in embodiments of the present disclosure, the DCI issued by the base station may include following three types. DCI merely for triggering retransmission of the HARQ-ACK sub-codebook; 2) DCI for scheduling the PDSCH set and for triggering retransmission of the HARQ-ACK sub-codebook; 3) DCI merely for scheduling the PDSCH set. For brief, in the embodiments of the present disclosure, the corresponding DCI in 1) is abbreviated as DCI format 1, the corresponding DCI in 2) is abbreviated as DCI format 2, and the corresponding DCI in 3) is abbreviated as DCI format 3.

In some embodiments, the base station may configure the DCI to have any one or more of DCI format 1, DCI format 2 and DCI format 3 through high-level signaling, or may specify the format of the DCI issued by the base station via an agreement.

In some embodiments, the number of HARQ-ACK sub-codebooks sent to the base station by the user terminal at the same HARQ-ACK feedback time may be greater than one. As described in the foregoing embodiments, when the base station delivers DCI format 2 to the user terminal, the user terminal needs to feed back to the base station HARQ-ACK sub-codebooks corresponding to multiple different PDSCH sets during the same HARQ-ACK feedback time.

The user terminal generally sends one HARQ-ACK codebook to the base station during one HARQ-ACK feedback time. In this case, multiple HARQ-ACK sub-codebooks may be set in the same HARQ-ACK codebook. In this case, the user terminal may sort multiple HARQ-ACK sub-codebooks in the HARQ-ACK codebook.

In some embodiments, when the user terminal needs to send multiple HARQ-ACK sub-codebooks to the base station at the same HARQ-ACK feedback time, there may be multiple methods for sorting the multiple HARQ-ACK sub-codebooks.

In some embodiments, the user terminal sorts the multiple HARQ-ACK sub-codebooks according to respective scheduling group numbers of the multiple HARQ-ACK sub-codebooks.

In some embodiments, the user terminal sorts the multiple HARQ-ACK sub-codebooks according to scheduling time of the PDSCHs corresponding to the multiple HARQ-ACK sub-codebooks.

In some embodiments, the user terminal sorts the multiple HARQ-ACK sub-codebooks according to the order of the C-DAI in the DCI corresponding to the multiple HARQ-ACK sub-codebooks.

In some embodiments, the HARQ-ACK sub-codebook corresponding to the trigger group may be placed before the HARQ-ACK sub-codebook corresponding to the scheduling group, or the HARQ-ACK sub-codebook corresponding to the trigger group may be placed after the HARQ-ACK sub-codebook corresponding to the scheduling group. In other words, the HARQ-ACK sub-codebook corresponding to the trigger group and the HARQ-ACK sub-codebook corresponding to the scheduling group are not interleaved.

In some embodiments, if a second trigger group DAI field is configured in DCI format 1, each trigger group in DCI format 1 has a one-to-one correspondence with the second trigger group DAI field, and the second trigger group DAI field can be used to indicate the T-DAI of the corresponding trigger group; if a third trigger group DAI field is configured, the third trigger group DAI field can be used to indicate a sum of the T-DAI of all trigger groups in DCI format 1.

For example, DCI format 1 is merely used to trigger the retransmission of the first HARQ-ACK sub-codebook, that is, DCI format 1 includes the first trigger group number field. Therefore, the second trigger group DAI field in DCI format 1 is used to indicate the T-DAI of the first trigger group.

For DCI format 2, the first scheduling group DAI field may merely be used to indicate the C-DAI of the corresponding scheduling group, and the second scheduling group DAI field may merely be used to indicate the T-DAI of the corresponding scheduling group. The first scheduling group DAI may be used to indicate a sum of the C-DAI of the corresponding scheduling group and the T-DAI of other trigger groups, and the second scheduling group DAI field may be used to indicate a sum of the T-DAI of the corresponding scheduling group and the T-DAI of other trigger groups.

For example, in DCI format 2, the first scheduling group number field is configured to be indicated as 1, and the second trigger group number field is configured to be indicated as 2. In this case, the first scheduling group DAI field in DCI format 2 may merely be used to indicate the C-DAI of the first scheduling group, and the second scheduling group DAI field may merely be used to indicate the T-DAI field of the first scheduling group. The first scheduling group DAI field in DCI format 2 may be used to indicate a sum of the C-DAI of the first scheduling group and the T-DAI of the second trigger group, and the second scheduling group DAI field may be used to indicate a sum of the T-DAI of the first scheduling group and the T-DAI of the second trigger group.

For DCI format 3, the first scheduling group DAI field may be used to indicate the C-DAI of the corresponding scheduling group, and the second scheduling group DAI field may be used to indicate the T-DAI of the corresponding scheduling group.

For example, if DCI format 3 is merely used to schedule the first PDSCH set, the first scheduling group DAI field in DCI format 3 is used to indicate the C-DAI of the first scheduling group, and the second scheduling group DAI field is used to indicate the T-DAI of the first scheduling group.

Figure 9:
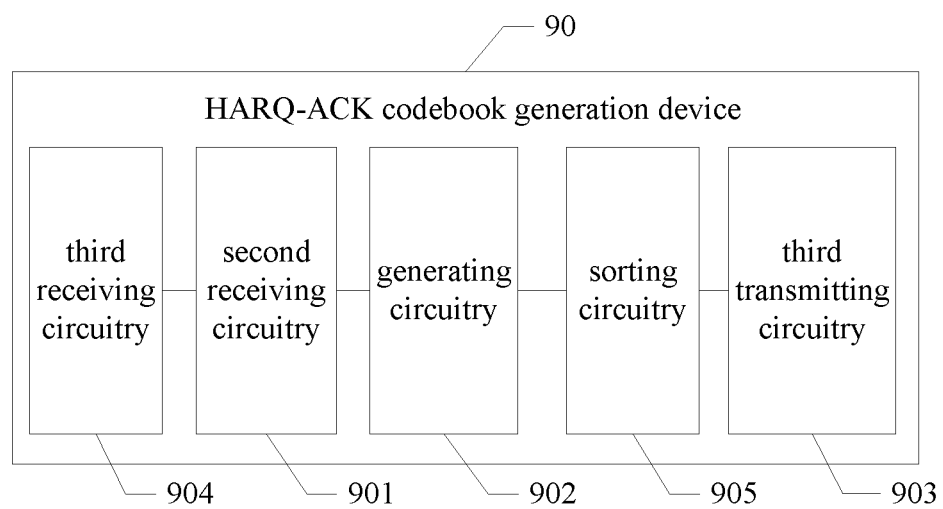
FIG. 9 is a structural diagram of a HARQ-ACK codebook generation device according to an embodiment.

In following embodiments, the first scheduling group DAI field in the DCI format 2 is merely used to indicate the C-DAI of the corresponding scheduling group, and the second scheduling group DAI field is merely used to indicate the T-DAI of the corresponding scheduling group. In the embodiment as shown in FIG. 9, the first scheduling group DAI field in DCI format 2 is used to indicate a sum of the C-DAI of the corresponding scheduling group and the T-DAI of other trigger groups, and the second scheduling group DAI field is used to indicate a sum of the T-DAI of the corresponding scheduling group and T-DAI of other trigger groups.

The downlink data scheduling HARQ-ACK codebook feedback method provided in the above embodiments of the present disclosure is further described in conjunction with following examples.

Example 1

Figure 2:
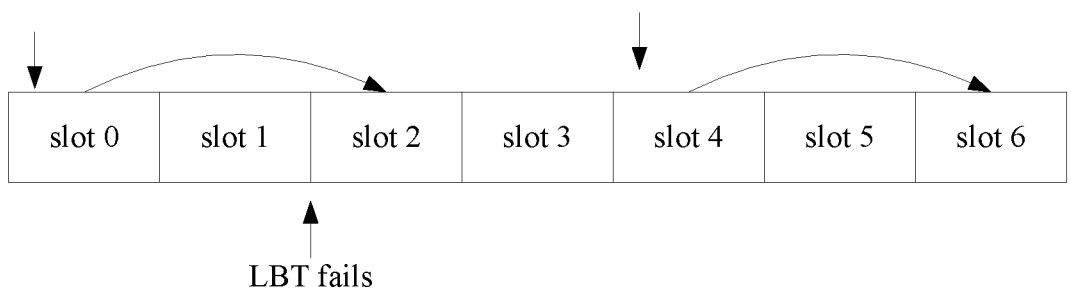
FIG. 2 is a time sequence diagram corresponding to a downlink data scheduling HARQ-ACK codebook feedback method according to an embodiment.

Referring to FIG. 2, FIG. 2 is a time sequence diagram corresponding to a downlink data scheduling HARQ-ACK codebook feedback method according to an embodiment. Detailed description is provided below in conjunction with FIG. 2.

It is assumed that the user terminal has only one serving cell. The base station delivers DCI format 3 to the user terminal in slot 0. In DCI format 3, K1=2, the first scheduling group number field is configured to be indicated as 1, that is, the first scheduling group is group 1, group 1 schedules the first PDSCH set, the first scheduling group DAI field is indicated as 1, the second scheduling group DAI field is indicated as 1.

As K1=2, after receiving the DCI format 3 issued by the base station, the user terminal should send the HARQ-ACK sub-codebook corresponding to the first PDSCH set scheduled by group 1 to the base station in slot 2. For brief, in subsequent embodiments, the HARQ-ACK sub-codebook corresponding to the first PDSCH set scheduled by group 1 is simply referred to as the first HARQ-ACK sub-codebook.

The user terminal fails in LBT in slot 2. Therefore, the user terminal cannot send the first HARQ-ACK sub-codebook to the base station, and the base station cannot detect the first HARQ-ACK sub-codebook sent by the user terminal.

The base station sends DCI format 1 to the user terminal in slot 4, and the DCI format 1 triggers the user terminal to retransmit the first HARQ-ACK sub-codebook corresponding to group 1. In DCI format 1, K1=2, which indicates that feedback is performed after 2 slots. The first trigger group number field is indicated as 1, and the second trigger group DAI field is indicated as 1.

After receiving the DCI format 1, the user terminal sends the first HARQ-ACK sub-codebook to the base station in slot 6. In this embodiment, the first HARQ-ACK sub-codebook fed back by the user terminal in slot 6 is the complete HARQ-ACK codebook.

Example 2

Still refer to FIG. 2.

It is assumed that the user terminal has only one serving cell. The base station delivers DCI format 3 to the user terminal in slot 0. In DCI format 3, K1=2, the first scheduling group number field is configured to be indicated as 1, that is, the first scheduling group is group 1, group 1 schedules the first PDSCH set, the first scheduling group DAI field is indicated as 1, the second scheduling group DAI field is indicated as 1.

The user terminal fails in LBT in slot 2. Therefore, the user terminal cannot send the first HARQ-ACK sub-codebook to the base station, and the base station cannot detect the first HARQ-ACK sub-codebook sent by the user terminal.

The base station sends DCI format 2 to the user terminal in slot 4. In DCI format 2, K1=2, which indicates that feedback is performed after 2 slots. The first trigger group number field is indicated as 1, and the second trigger group DAI field is indicated as 1. Further, in DCI format 2, it is also configured with a second scheduling group number field, a first scheduling group DAI field and a second scheduling group DAI field, where the second scheduling group number field is indicated as 2, the first scheduling group DAI field is indicated as 1, and the second scheduling group DAI field is indicated as 1. That is, in DCI format 2, the base station instructs the user terminal to retransmit the first HARQ-ACK sub-codebook, and also instructs the user terminal to send to the base station the HARQ-ACK sub-codebook corresponding to the second PDSCH set scheduled by group 2 after 2 slots.

After receiving the DCI format 2, the user terminal should send the first HARQ-ACK sub-codebook and the second HARQ-ACK sub-codebook to the base station in slot 6. For brief, in subsequent embodiments, the HARQ-ACK sub-codebook corresponding to the second PDSCH set scheduled by group 2 is simply referred to as the second HARQ-ACK sub-codebook.

The user terminal sends the HARQ-ACK codebook to the base station in slot 6, and the sent HARQ-ACK codebook includes the first HARQ-ACK sub-codebook and the second HARQ-ACK sub-codebook. The user terminal sorts the first HARQ-ACK sub-codebook and the second HARQ-ACK sub-codebook in the HARQ-ACK codebook.

As the first HARQ-ACK sub-codebook corresponds to group 1, and the second HARQ-ACK sub-codebook corresponds to group 2, therefore, in the HARQ-ACK codebook, the first HARQ-ACK sub-codebook is ranked before the second HARQ-ACK sub-codebook. When analyzing the HARQ-ACK codebook sent by the user terminal, the base station first analyzes the first HARQ-ACK sub-codebook, and then analyzes the second HARQ-ACK sub-codebook.

Example 3

Figure 3:
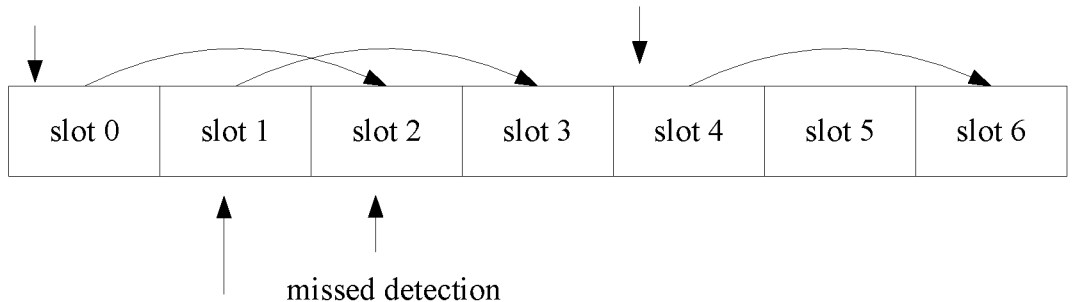
FIG. 3 is a time sequence diagram corresponding to a downlink data scheduling HARQ-ACK codebook feedback method according to an embodiment.

Referring to FIG. 3, FIG. 3 is a time sequence diagram corresponding to a downlink data scheduling HARQ-ACK codebook feedback method according to an embodiment. Detailed description is provided below in conjunction with FIG. 3.

It is assumed that the user terminal has only one serving cell. The base station delivers DCI format 3 to the user terminal in slot 0. In DCI format 3, K1=2, the first scheduling group number field is configured to be indicated as 1, that is, the first scheduling group is group 1, group 1 schedules the first PDSCH set, the first scheduling group DAI field is indicated as 1, the second scheduling group DAI field is indicated as 1.

As K1=2, the user terminal sends the first HARQ-ACK sub-codebook corresponding to the first PDSCH set to the base station in slot 2. The base station fails to detect the first HARQ-ACK sub-codebook sent by the user terminal due to missed detection.

The base station delivers DCI format 3 to the user terminal in slot 1. In DCI format 3, K1=2, the second scheduling group number field is configured to be indicated as 2, the first scheduling group DAI field is indicated as 1, and the second scheduling group DAI field is indicated as 1.

After receiving the DCI format 3 issued by the base station, the user terminal should send the HARQ-ACK sub-codebook corresponding to the second PDSCH set scheduled by group 3 to the base station in slot 3.

The base station successfully receives the second HARQ-ACK sub-codebook sent by the user terminal in slot 3.

The base station sends DCI format 2 to the user terminal in slot 4. In DCI format 2, K1=2. The first trigger group number field is indicated as 1, and the second trigger group DAI field is indicated as 1. Further, in DCI format 2, a third scheduling group number field is indicated as 3, the first scheduling group DAI field is indicated as 1, and the second scheduling group DAI field is indicated as 1.

That is, in DCI format 2, the base station instructs the user terminal to retransmit the first HARQ-ACK sub-codebook in slot 6, and also instructs the user terminal to send to the base station the HARQ-ACK sub-codebook corresponding to the third PDSCH set scheduled by group 3 in slot 6. For brief, in subsequent embodiments, the HARQ-ACK sub-codebook corresponding to the third PDSCH set scheduled by group 3 is simply referred to as the third HARQ-ACK sub-codebook.

After receiving the DCI format 2, the user terminal should send the first HARQ-ACK sub-codebook and the third HARQ-ACK sub-codebook to the base station in slot 6. The user terminal sorts the first HARQ-ACK sub-codebook and the third HARQ-ACK sub-codebook in the HARQ-ACK codebook. As group 1 schedules the first PDSCH set earlier than group 3 schedules the third PDSCH set, therefore, in the HARQ-ACK codebook, the first HARQ-ACK sub-codebook is ranked before the third HARQ-ACK sub-codebook. The user terminal sends the HARQ-ACK codebook to the base station. When analyzing the HARQ-ACK codebook sent by the user terminal, the base station first analyzes the first HARQ-ACK sub-codebook, and then analyzes the third HARQ-ACK sub-codebook.

Example 4

Figure 4:
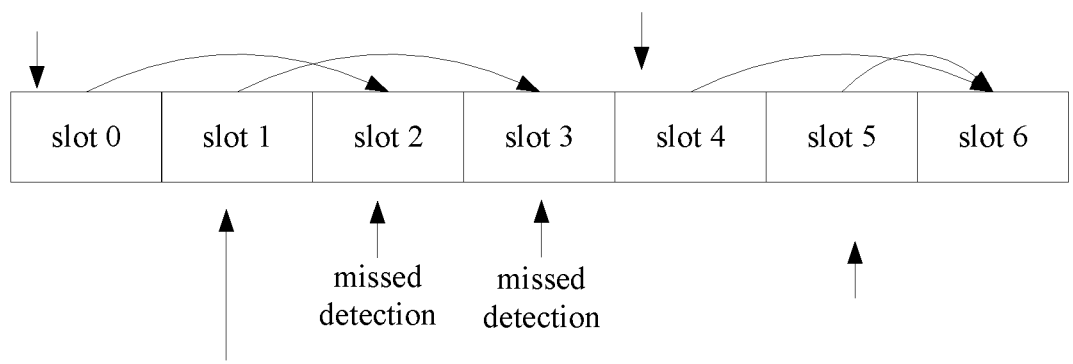
FIG. 4 is a time sequence diagram corresponding to a downlink data scheduling HARQ-ACK codebook feedback method according to an embodiment.

Referring to FIG. 4, FIG. 4 is a time sequence diagram corresponding to a downlink data scheduling HARQ-ACK codebook feedback method according to an embodiment. Detailed description is provided below in conjunction with FIG. 4.

It is assumed that the user terminal has only one serving cell. The base station delivers DCI format 3 to the user terminal in slot 0. In DCI format 3, K1=2, the first scheduling group number field is indicated as 1, that is, the first scheduling group is group 1, group 1 schedules the first PDSCH set, the first scheduling group DAI field is indicated as 1, the second scheduling group DAI field is indicated as 1.

As K1=2, the user terminal sends the first HARQ-ACK sub-codebook corresponding to the first PDSCH set to the base station in slot 2. The base station fails to detect the first HARQ-ACK sub-codebook sent by the user terminal due to missed detection.

The base station delivers DCI format 3 to the user terminal in slot 1. In DCI format 3, K1=2, the second scheduling group number field is indicated as 2, the first scheduling group DAI field is indicated as 1, and the second scheduling group DAI field is indicated as 1.

After receiving the DCI format 3 issued by the base station in slot 1, the user terminal should send the HARQ-ACK sub-codebook corresponding to the second PDSCH set scheduled by group 3 to the base station in slot 3. The base station fails to detect the second HARQ-ACK sub-codebook sent by the user terminal due to missed detection.

The base station sends DCI format 2 to the user terminal in slot 4. In DCI format 2, K1=2. The first trigger group number field is indicated as 1, and the second trigger group DAI field is indicated as 1. Further, in DCI format 2, a third scheduling group number field is indicated as 3, the first scheduling group DAI field is indicated as 1, and the second scheduling group DAI field is indicated as 1.

That is, in DCI format 2 delivered in slot 4, the base station instructs the user terminal to retransmit the first HARQ-ACK sub-codebook in slot 6, and also instructs the user terminal to send to the base station the HARQ-ACK sub-codebook corresponding to the third PDSCH set scheduled by group 3 in slot 6. For brief, in subsequent embodiments, the HARQ-ACK sub-codebook corresponding to the third PDSCH set scheduled by group 3 is simply referred to as the third HARQ-ACK sub-codebook.

After receiving the DCI format 2 delivered by the base station in slot 4, the user terminal should send the first HARQ-ACK sub-codebook and the third HARQ-ACK sub-codebook to the base station in slot 6.

The base station delivers DCI format 2 to the user terminal in slot 5. In DCI format 2, K1=1, the second trigger group number field is configured to be indicated as 2, and the second trigger group DAI field is configured to be indicated as 1. Further, in DCI format 2, a third scheduling group number field is indicated as 3, the first scheduling group DAI field is indicated as 2, and the second scheduling group DAI field is indicated as 2.

After receiving the DCI format 2 issued by the base station in slot 5, the user terminal should send the second HARQ-ACK sub-codebook and the third HARQ-ACK sub-codebook to the base station in slot 6.

The base station sends DCI format 2 to the user terminal in slot 4 and also sends DCI format 2 to the user terminal in slot 5. Information included in the DCI format 2 sent by the base station to the user terminal in two synchronized slots is different. In the DCI format 2 issued in slot 4, it indicates that group 3 has scheduled a PDSCH; in the DCI format 2 issued in slot 5, it indicates that group 3 has scheduled another PDSCH. In other words, the base station indicates, in the DCI format 2 issued in different slots, that group 3 has scheduled two different PDSCHs, and these two different PDSCHs constitute the third PDSCH set.

Therefore, the user terminal needs to feed back three PDSCH sets in slot 6. The trigger group is placed before the scheduling group. It can be seen from the above examples that the trigger group includes group 1 and group 2, and the scheduling group includes group 3. Therefore, the user terminal can sort the HARQ-ACK sub-codebooks corresponding to the above 3 PDSCH sets as follows. HARQ-ACK sub-codebook corresponding to group 1 is placed first, the HARQ-ACK sub-codebook corresponding to group 2 is placed after the HARQ-ACK sub-codebook corresponding to group 1, and the HARQ-ACK sub-codebook corresponding to group 3 is placed after the HARQ-ACK sub-codebook corresponding group 2. The HARQ-ACK sub-codebook corresponding to the PDSCH set scheduled by group 3 has 2 bits, where the first bit corresponds to the PDSCH scheduled in slot 4, and the second bit corresponds to the PDSCH scheduled in slot 5.

The user terminal sends the above sorted HARQ-ACK codebook to the base station. In the HARQ-ACK codebook, the order of the three HARQ-ACK sub-codebooks is the HARQ-ACK sub-codebook corresponding to group 1, the HARQ-ACK sub-codebook corresponding to group 2, the HARQ-ACK feedback of group 3 scheduling the PDSCH in slot 4, and the HARQ-ACK feedback of group 3 scheduling the PDSCH in slot 5.

It should be noted that, in example 4, the base station has issued two DCI format 3 in slot 0 and slot 1, respectively, and information carried in the DCI format 3 issued by the base station in different time slots is different. The base station has issued two DCI format 2 in slot 4 and slot 5, respectively, and information carried in the DCI format 2 issued by the base station in different time slots is different as well.

Example 5

Figure 5:
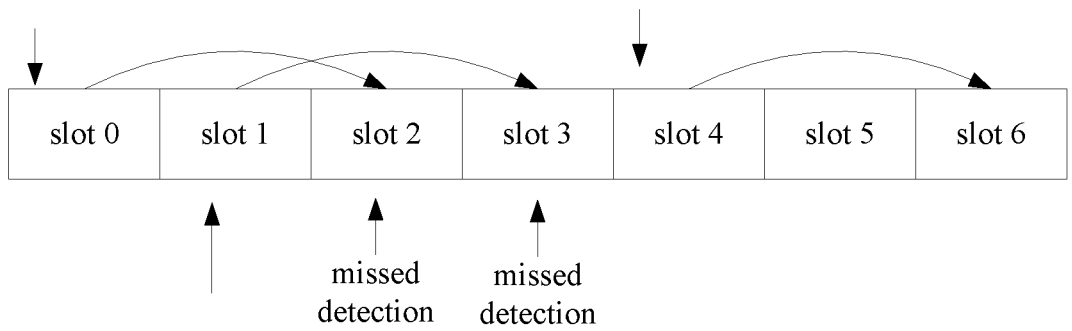
FIG. 5 is a time sequence diagram corresponding to a downlink data scheduling HARQ-ACK codebook feedback method according to an embodiment.

Referring to FIG. 5, FIG. 5 is a time sequence diagram corresponding to a downlink data scheduling HARQ-ACK codebook feedback method according to an embodiment. Detailed description is provided below in conjunction with FIG. 5.

It is assumed that the user terminal has only one serving cell. The base station delivers DCI format 3 to the user terminal in slot 0. In DCI format 3, K1=2, the first scheduling group number field is indicated as 1, that is, the first scheduling group is group 1, group 1 schedules the first PDSCH set, the first scheduling group DAI field is indicated as 1, the second scheduling group DAI field is indicated as 1.

As K1=2, the user terminal sends the first HARQ-ACK sub-codebook corresponding to the first PDSCH set to the base station in slot 2. The base station fails to detect the first HARQ-ACK sub-codebook sent by the user terminal due to missed detection.

The base station delivers DCI format 3 to the user terminal in slot 1. In DCI format 3, K1=2, the second scheduling group number field is indicated as 2, the first scheduling group DAI field is indicated as 1, and the second scheduling group DAI field is indicated as 1.

After receiving the DCI format 3 issued by the base station in slot 1, the user terminal should send the HARQ-ACK sub-codebook corresponding to the second PDSCH set scheduled by group 3 to the base station in slot 3. The base station fails to detect the second HARQ-ACK sub-codebook sent by the user terminal due to missed detection.

The base station sends DCI format 2 to the user terminal in slot 4. In DCI format 2, K1=2. The first trigger group number field is indicated as 1, the second trigger group number field is indicated as 2, and the third trigger group DAI field is indicated as 2. Further, in DCI format 2, a third scheduling group number field is indicated as 3, the first scheduling group DAI field is indicated as 1, and the second scheduling group DAI field is indicated as 1.

That is, in DCI format 2 delivered in slot 4, the base station instructs the user terminal to retransmit the first HARQ-ACK sub-codebook and the second HARQ-ACK sub-codebook in slot 6, and also instructs the user terminal to send to the base station the third HARQ-ACK sub-codebook in slot 6.

After receiving the DCI format 2 delivered by the base station in slot 4, the user terminal should send the first HARQ-ACK sub-codebook, the second HARQ-ACK sub-codebook and the third HARQ-ACK sub-codebook to the base station in slot 6. In the HARQ-ACK codebook, the above three HARQ-ACK sub-codebooks are sorted according to the order of group numbers, the first HARQ-ACK sub-codebook is placed first, and the third HARQ-ACK sub-codebook is placed to the end.

Example 6

Figure 6:
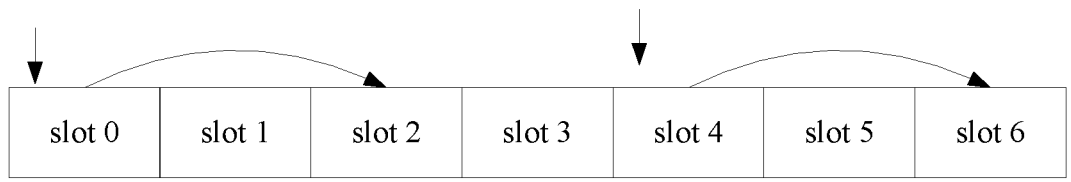
FIG. 6 is a time sequence diagram corresponding to a downlink data scheduling HARQ-ACK codebook feedback method according to an embodiment.

Referring to FIG. 6, FIG. 6 is a time sequence diagram corresponding to a downlink data scheduling HARQ-ACK codebook feedback method according to an embodiment. Detailed description is provided below in conjunction with FIG. 6.

It is assumed that the user terminal has only one serving cell. The base station delivers DCI format 3 to the user terminal in slot 0. In DCI format 3, K1=2, the first scheduling group number field is configured to be indicated as 1, that is, the first scheduling group is group 1, group 1 schedules the first PDSCH set, the first scheduling group DAI field is indicated as 1, the second scheduling group DAI field is indicated as 1.

The user terminal successfully sends the first HARQ-ACK sub-codebook in slot 2, and the base station successfully receives the first HARQ-ACK sub-codebook.

The base station sends DCI format 2 to the user terminal in slot 4. In DCI format 2, K1=2, which indicates that feedback is performed after 2 slots. The second trigger group number field is indicated as 2, and the second trigger group DAI field is indicated as 1. Further, in DCI format 2, it is also configured with a second scheduling group number field, a first scheduling group DAI field and a second scheduling group DAI field, where the second scheduling group number field is indicated as 2, the first scheduling group DAI field is indicated as 1, and the second scheduling group DAI field is indicated as 1. That is, in DCI format 2, the base station instructs the user terminal to retransmit the first HARQ-ACK sub-codebook, and also instructs the user terminal to send to the base station the HARQ-ACK sub-codebook corresponding to the second PDSCH set scheduled by group 2 after 2 slots.

After receiving the DCI format 2, the user terminal detects that both the second trigger group number field and the second scheduling group number field are indicated as 2. Therefore, the user terminal can determine that the DCI format 2 does not trigger HARQ-ACK sub-codebook feedback of other groups. Therefore, the user terminal sends the second HARQ-ACK sub-codebook to the base station in slot 6. In this embodiment, the second HARQ-ACK sub-codebook fed back by the user terminal in slot 6 is the complete HARQ-ACK codebook.

Example 7

Description is provided in conjunction with FIG. 6. It is assumed that the user terminal has only one serving cell. The base station delivers DCI format 3 to the user terminal in slot 0. In DCI format 3, K1=2, the first scheduling group number field is configured to be indicated as 1, that is, the first scheduling group is group 1, group 1 schedules the first PDSCH set, the first scheduling group DAI field is indicated as 1, the second scheduling group DAI field is indicated as 1.

The user terminal successfully sends the first HARQ-ACK sub-codebook in slot 2, and the base station successfully receives the first HARQ-ACK sub-codebook.

The base station sends DCI format 2 to the user terminal in slot 4. In DCI format 2, K1=2, which indicates that feedback is performed after 2 slots. The second trigger group number field is indicated as NAN, and the second trigger group DAI field is indicated as 1. Further, in DCI format 2, it is also configured with a second scheduling group number field, a first scheduling group DAI field and a second scheduling group DAI field, where the second scheduling group number field is indicated as 2, the first scheduling group DAI field is indicated as 1, and the second scheduling group DAI field is indicated as 1.

After receiving the DCI format 2, the user terminal detects that the second trigger group number field is indicated as NAN, and the second scheduling group number field is indicated as 2. Therefore, the user terminal can send the second HARQ-ACK sub-codebook to the base station in slot 6. In this embodiment, the second HARQ-ACK sub-codebook fed back by the user terminal in slot 6 is the complete HARQ-ACK codebook.

Example 8

Description is provided in conjunction with FIG. 2.

It is assumed that the user terminal has only one serving cell. The base station delivers DCI format 3 to the user terminal in slot 0. In DCI format 3, K1=2, the first scheduling group number field is indicated as 1, that is, the first scheduling group is group 1, group 1 schedules the first PDSCH set, the first scheduling group DAI field is indicated as 1, the second scheduling group DAI field is indicated as 1.

The user terminal fails in LBT in slot 2. Therefore, the user terminal cannot send the first HARQ-ACK sub-codebook corresponding to the first PDSCH set to the base station, and the base station cannot detect the first HARQ-ACK sub-codebook sent by the user terminal.

The base station sends DCI format 2 to the user terminal in slot 4. In DCI format 2, K1=2, which indicates that feedback is performed after 2 slots. The first trigger group number field is indicated as 1, and the second trigger group DAI field is indicated as 1. Further, in DCI format 2, it is also configured with a second scheduling group number field, a first scheduling group DAI field and a second scheduling group DAI field, where the second scheduling group number field is indicated as 2, the first scheduling group DAI field is indicated as 2, and the second scheduling group DAI field is indicated as 2. That is, in DCI format 2, the base station instructs the user terminal to retransmit the first HARQ-ACK sub-codebook, and also instructs the user terminal to send to the base station the HARQ-ACK sub-codebook corresponding to the second PDSCH set scheduled by group 2 after 2 slots.

After receiving the DCI format 2, the user terminal should send the first HARQ-ACK sub-codebook and the second HARQ-ACK sub-codebook to the base station in slot 6.

The difference from the example two lies in that the first scheduling group DAI field is used to indicate a sum of C-DAI in this scheduling group and T-DAI in the trigger group, and the second scheduling group DAI field is used to indicate a sum of T-DAI in this scheduling group and the T-DAI in the trigger group T-DAI. In the HARQ-ACK codebook, the first HARQ-ACK sub-codebook and the second HARQ-ACK sub-codebook are sorted according to the C-DAI, so that the first HARQ-ACK sub-codebook is arranged before the second HARQ-ACK sub-codebook.

Figure 7:
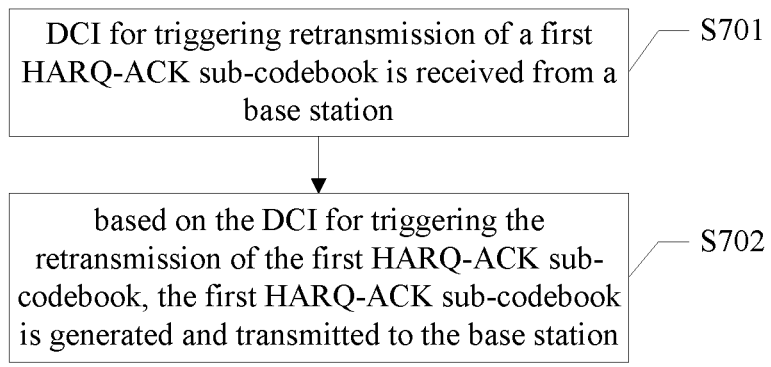
FIG. 7 is a flow chart of a HARQ-ACK codebook generation method according to an embodiment.

FIG. 7 is a flow chart of a HARQ-ACK codebook generation method according to an embodiment. The method may include S701 and S702.

In S701, DCI for triggering retransmission of a first HARQ-ACK sub-codebook is received from a base station.

In some embodiments, the base station may transmit to the user terminal DCI for scheduling the first PDSCH set in advance. The DCI for scheduling the first PDSCH set includes a first scheduling group number field and a value of K1. The first scheduling group number field is used to indicate a number of the first scheduling group, and the value of K1 is used to indicate in which slot the user terminal performs HARQ-ACK sub-codebook feedback.

For example, in the DCI for scheduling the first PDSCH set delivered by the base station in slot 0, the base station configures the first scheduling group number field to be indicated as 1, and K1=2. Then the user terminal should send the first HARQ-ACK sub-codebook corresponding to the first PDSCH set scheduled by group 1 (i.e., the first scheduling group) to the base station in slot 2.

However, in practice, the user terminal needs to perform an LBT operation first. After the LBT is successful, the user terminal sends the first HARQ-ACK sub-codebook to the base station. If the LBT fails, the user terminal cannot send the first HARQ-ACK sub-codebook to the base station. In this case, the base station also cannot detect the first HARQ-ACK sub-codebook sent by the user terminal.

In addition, even if the user terminal succeeds in the LBT and successfully sends the first HARQ-ACK sub-codebook to the base station, the base station may miss the detection, that is, the base station may not detect the first HARQ-ACK sub-codebook sent by the user terminal.

Therefore, in the embodiments of the present disclosure, the base station may first determine whether the first HARQ-ACK sub-codebook sent by the user terminal is detected. If the base station does not detect the first HARQ-ACK sub-codebook sent by the user terminal, the base station may send to the user terminal the DCI for triggering retransmission of the first HARQ-ACK sub-codebook.

In some embodiments, the DCI for triggering the retransmission of the first HARQ-ACK sub-codebook includes a first trigger group number field which may be the same as the first scheduling group number field, the first trigger group number field is used to indicate a number of the first trigger group, and the first scheduling group number field is used to indicate a number of the first scheduling group.

That is, in the embodiments of the present disclosure, if the base station does not detect the HARQ-ACK sub-codebook corresponding to the PDSCH set scheduled by a certain scheduling group, the base station may instruct the user terminal to retransmit the HARQ-ACK sub-codebook corresponding to the PDSCH set scheduled by the scheduling group.

For example, the HARQ-ACK sub-codebook corresponding to the first PDSCH set scheduled by the scheduling group 1 is the first HARQ-ACK sub-codebook. If the base station does not detect the first HARQ-ACK sub-codebook, the base station instructs the user terminal to retransmit the first HARQ-ACK sub-codebook.

In S702, based on the DCI for triggering the retransmission of the first HARQ-ACK sub-codebook, the first HARQ-ACK sub-codebook is generated and transmitted to the base station.

In some embodiments, after receiving the DCI issued by the base station for triggering the retransmission of the first HARQ-ACK sub-codebook, the user terminal may generate the first HARQ-ACK sub-codebook and send it to the base station accordingly.

With S701 and S702, the base station can specifically instruct a particular downlink data scheduling group before a current group to perform HARQ-ACK sub-codebook re-feedback, rather than merely indicating N consecutive downlink data scheduling groups before the current group to perform HARQ-ACK sub-codebook feedback simultaneously, thereby effectively reducing uplink control signaling overhead.

In some embodiments, the DCI for scheduling the first PDSCH set further includes a first scheduling group DAI field and a second scheduling group DAI field. In some embodiments, the first scheduling group DAI field is used to indicate C-DAI of the first scheduling group, and the second scheduling group DAI field is used to indicate T-DAI of the first scheduling group.

In some embodiments, the DCI for scheduling the first PDSCH set further includes other trigger group number field for indicating a number of other trigger group. That is, after receiving the DCI for scheduling the first PDSCH set, the user terminal may obtain the first scheduling group number field and other trigger group number field therefrom. The user terminal may generate HARQ-ACK sub-codebooks corresponding to other trigger group number field based on the other trigger group number field.

For example, in the DCI for scheduling the first PDSCH set, the first scheduling group number field is 1, and the second trigger group number field is 2. The second trigger group number field is the same as the second scheduling group number field, and the second scheduling group number field is used to indicate a second scheduling group for scheduling a second PDSCH set, and the HARQ-ACK sub-codebook corresponding to the second PDSCH set is the second HARQ-ACK sub-codebook. Therefore, after receiving the DCI for scheduling the first PDSCH set, the user terminal retransmits the first HARQ-ACK sub-codebook and the second HARQ-ACK sub-codebook to the base station.

In some embodiments, when the DCI for scheduling the first PDSCH set includes the other trigger group number field, the first scheduling group DAI field is used to indicate a sum of the C-DAI of the first scheduling group and T-DAI of the other trigger group, and the second scheduling group DAI field is used to indicate a sum of the T-DAI of the first scheduling group and the T-DAI of the other trigger group.

In some embodiments, the DCI for triggering the retransmission of the first HARQ-ACK sub-codebook further includes other scheduling group number field for indicating a number of a scheduling group where other scheduled PDSCH set is located.

That is, after receiving the DCI for triggering the retransmission of the first HARQ-ACK sub-codebook, the user terminal may obtain the first trigger group number field and other scheduling group number field therefrom, and respectively for the first trigger group number field and other scheduling group number field, retransmit the first HARQ-ACK sub-codebook and the HARQ-ACK sub-codebook corresponding to the other scheduling group number field.

For example, in the DCI for triggering the retransmission of the first HARQ-ACK sub-codebook, the first trigger group number field is 1, and the second scheduling group number field is 2. The second scheduling group number field is used to indicate the number of the second scheduling group for scheduling the second PDSCH set, and the HARQ-ACK sub-codebook corresponding to the second PDSCH set is the second HARQ-ACK sub-codebook.

Therefore, after receiving the DCI for triggering the retransmission of the first HARQ-ACK sub-codebook, the user terminal retransmits the first HARQ-ACK sub-codebook to the base station and simultaneously transmits the second HARQ-ACK sub-codebook to the base station.

In some embodiments, the DCI for triggering the retransmission of the first HARQ-ACK sub-codebook further includes a second trigger group DAI field for indicating T-DAI of the first trigger group. The DCI for triggering the retransmission of the first HARQ-ACK sub-codebook may further include a third trigger group DAI field for indicating a sum of T-DAI of all trigger groups in the DCI for triggering the retransmission of the first HARQ-ACK sub-codebook.

From above, in embodiments of the present disclosure, the DCI issued by the base station for triggering the retransmission of the first HARQ-ACK sub-codebook may only be used for triggering the user terminal to retransmit the first HARQ-ACK sub-codebook. When the DCI of the user terminal for triggering the retransmission of the first HARQ-ACK sub-codebook further includes other scheduling group number field, the user terminal may also be triggered to send HARQ-ACK sub-codebook corresponding to the other scheduling group number field.

Accordingly, the DCI issued by the base station for scheduling the first PDSCH set may only be used for scheduling the user terminal to send the first HARQ-ACK sub-codebook. When the DCI for scheduling the first PDSCH set further includes the other trigger group number field, the user terminal may also be triggered to retransmit the HARQ-ACK sub-codebook corresponding to the other trigger group number field.

Figure 8:
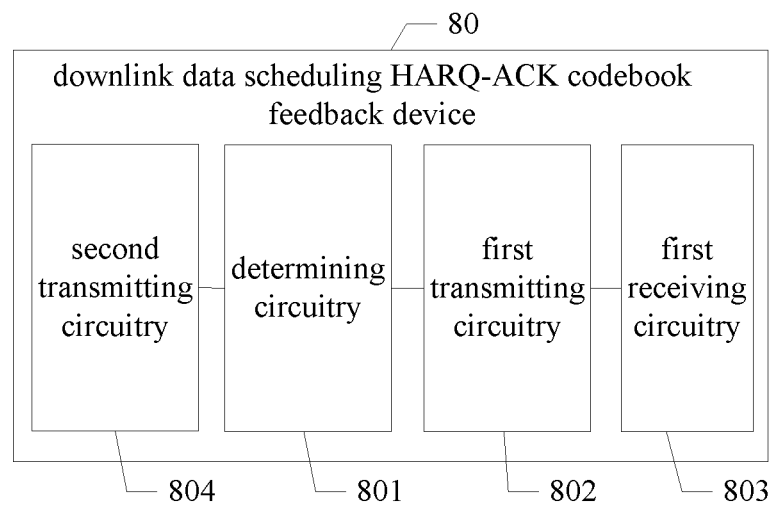
FIG. 8 is a structural diagram of a downlink data scheduling HARQ-ACK codebook feedback device according to an embodiment.

FIG. 8 is a structural diagram of a downlink data scheduling HARQ-ACK codebook feedback device 80 according to an embodiment. The device 80 may include a determining circuitry 801, a first transmitting circuitry 802 and a first receiving circuitry 803.

The determining circuitry 801 is configured to determine whether a first HARQ-ACK sub-codebook sent by a user terminal is detected, wherein the first HARQ-ACK sub-codebook is a feedback generated after the user terminal receives a first PDSCH set, and the first PDSCH set is in a first scheduling group for scheduling the first PDSCH set.

The first transmitting circuitry 802 is configured to: when the determining circuitry 801 determines that the first HARQ-ACK sub-codebook is not detected, transmit to the user terminal DCI for triggering retransmission of the first HARQ-ACK sub-codebook, wherein the DCI for triggering the retransmission of the first HARQ-ACK sub-codebook includes a first trigger group number field which is the same as a first scheduling group number field, the first trigger group number field is used to indicate a number of the first trigger group, and the first scheduling group number field is used to indicate a number of the first scheduling group.

The first receiving circuitry 803 is configured to receive the first HARQ-ACK sub-codebook retransmitted by the user terminal.

In some embodiments, the device 80 further includes a second transmitting circuitry 804 configured to: before the determining circuitry 801 determines whether the first HARQ-ACK sub-codebook sent by the user terminal is detected, transmit to the user terminal DCI for scheduling the first PDSCH set, wherein the DCI for scheduling the first PDSCH set includes the first scheduling group number field.

In some embodiments, the DCI for scheduling the first PDSCH set further includes a first scheduling group DAI field and a second scheduling group DAI field, the first scheduling group DAI field is used to indicate C-DAI of the first scheduling group, and the second scheduling group DAI field is used to indicate T-DAI of the first scheduling group.

In some embodiments, the DCI for scheduling the first PDSCH set further includes other trigger group number field for indicating a number of other trigger group.

In some embodiments, when the DCI for scheduling the first PDSCH set includes the other trigger group number field, the first scheduling group DAI field is used to indicate a sum of the C-DAI of the first scheduling group and T-DAI of the other trigger group, and the second scheduling group DAI field is used to indicate a sum of the T-DAI of the first scheduling group and the T-DAI of the other trigger group.

In some embodiments, the first receiving circuitry 803 is further configured to receive a HARQ-ACK sub-codebook generated by the user terminal based on the other trigger group number field.

In some embodiments, the DCI for triggering the retransmission of the first HARQ-ACK sub-codebook further includes other scheduling group number field for indicating a number of a scheduling group where other scheduled PDSCH set is located.

In some embodiments, the DCI for triggering the retransmission of the first HARQ-ACK sub-codebook further includes a second trigger group DAI field for indicating T-DAI of the first trigger group.

In some embodiments, the DCI for triggering the retransmission of the first HARQ-ACK sub-codebook further includes a third trigger group DAI field for indicating a sum of T-DAI of all trigger groups in the DCI for triggering the retransmission of the first HARQ-ACK sub-codebook.

In some embodiments, the first receiving circuitry 803 is further configured to receive a HARQ-ACK sub-codebook generated by the user terminal based on the other scheduling group number field.

FIG. 9 is a structural diagram of a HARQ-ACK codebook generation device 90 according to an embodiment. The device 90 includes a second receiving circuitry 901, a generating circuitry 902 and a third transmitting circuitry 903.

The second receiving circuitry 901 is configured to receive from a base station DCI for triggering retransmission of a first HARQ-ACK sub-codebook, wherein the DCI for triggering the retransmission of the first HARQ-ACK sub-codebook includes a first trigger group number field, the first trigger group number field is the same as a first scheduling group number field, the first trigger group number field is used to indicate a number of a first trigger group, and the first scheduling group number field is used to indicate a number of a first scheduling group, the first HARQ-ACK sub-codebook is a feedback generated after receiving a first PDSCH set which is in the first scheduling group.

The generating circuitry 902 is configured to: based on the DCI for triggering the retransmission of the first HARQ-ACK sub-codebook, generate the first HARQ-ACK sub-codebook.

The third transmitting circuitry 903 is configured to transmit the first HARQ-ACK sub-codebook to the base station.

In some embodiments, the device 90 further includes a third receiving circuitry 904 configured to: before the second receiving circuitry 901 receives from the base station the DCI for triggering the retransmission of the first HARQ-ACK sub-codebook, receive from the base station DCI for scheduling the first PDSCH set, wherein the DCI for scheduling the first PDSCH set includes the first scheduling group number field.

In some embodiments, the DCI for scheduling the first PDSCH set further includes a first scheduling group DAI field and a second scheduling group DAI field, the first scheduling group DAI field is used to indicate C-DAI of the first scheduling group, and the second scheduling group DAI field is used to indicate T-DAI of the first scheduling group.

In some embodiments, the DCI for scheduling the first PDSCH set further includes other trigger group number field for indicating a number of other trigger group.

In some embodiments, when the DCI for scheduling the first PDSCH set includes the other trigger group number field, the first scheduling group DAI field is used to indicate a sum of the C-DAI of the first scheduling group and T-DAI of the other trigger group, and the second scheduling group DAI field is used to indicate a sum of the T-DAI of the first scheduling group and the T-DAI of the other trigger group.

In some embodiments, the generating circuitry 902 is further configured to: generate and feed back to the base station a HARQ-ACK sub-codebook corresponding to the other trigger group number field.

In some embodiments, the DCI for triggering the retransmission of the first HARQ-ACK sub-codebook further includes other scheduling group number field for indicating a number of a scheduling group where other scheduled PDSCH set is located.

In some embodiments, the DCI for triggering the retransmission of the first HARQ-ACK sub-codebook further includes a second trigger group DAI field for indicating T-DAI of the first trigger group.

In some embodiments, the DCI for triggering the retransmission of the first HARQ-ACK sub-codebook further includes a third trigger group DAI field for indicating a sum of T-DAI of all trigger groups in the DCI for triggering the retransmission of the first HARQ-ACK sub-codebook.

In some embodiments, the generating circuitry 902 is further configured to: generate and feed back to the base station a HARQ-ACK sub-codebook corresponding to the other scheduling group number field.

In some embodiments, the device 90 further includes a sorting circuitry 905 configured to: when a plurality of HARQ-ACK sub-codebooks are transmitted to the base station at a same HARQ-ACK feedback time, sort the plurality of HARQ-ACK sub-codebooks.

In some embodiments, the sorting circuitry 905 is configured to: sort the plurality of HARQ-ACK sub-codebooks based on scheduling group numbers corresponding to the plurality of HARQ-ACK sub-codebooks; sort the plurality of HARQ-ACK sub-codebooks based on scheduling time of PDSCH corresponding to the plurality of HARQ-ACK sub-codebooks; or sort the plurality of HARQ-ACK sub-codebooks based on an order of C-DAI in DCI corresponding to the plurality of HARQ-ACK sub-codebooks.

In an embodiment of the present disclosure, a non-volatile or nonstationary computer readable storage medium having computer instructions stored therein is provided, wherein when the computer instructions are executed, any one of the above downlink data scheduling HARQ-ACK codebook feedback methods is performed.

In an embodiment of the present disclosure, a non-volatile or nonstationary computer readable storage medium having computer instructions stored therein is provided, wherein when the computer instructions are executed, any one of the above HARQ-ACK codebook generation methods is performed.

In an embodiment of the present disclosure, a downlink data scheduling HARQ-ACK codebook feedback device including a memory and a processor is provided, wherein the memory has computer instructions stored therein, and when the processor executes the computer instructions, any one of the above downlink data scheduling HARQ-ACK codebook feedback methods is performed.

In an embodiment of the present disclosure, a HARQ-ACK codebook generation device including a memory and a processor is provided, wherein the memory has computer instructions stored therein, and when the processor executes the computer instructions, any one of the above HARQ-ACK codebook generation methods is performed.

Those skilled in the art could understand that all or part of the steps in the various methods of the foregoing embodiments may be completed by a program instructing relevant hardware, and the program may be stored in a computer readable storage medium. The storage medium may include a Read Only Memory (ROM), a Random Access Memory (RAM), a magnetic disk or an optical disk.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A downlink data scheduling Hybrid Automatic Repeat request-ACKnowledgement (HARQ-ACK) codebook feedback method, comprising:
   determining whether a first HARQ-ACK sub-codebook sent by a user terminal is detected, wherein the first HARQ-ACK sub-codebook is a feedback generated after the user terminal receives a first Physical Downlink Shared CHannel (PDSCH) set, and the first PDSCH set is in a first scheduling group for scheduling the first PDSCH set;
   when the first HARQ-ACK sub-codebook is not detected, transmitting to the user terminal Downlink Control Information (DCI) for triggering retransmission of the first HARQ-ACK sub-codebook, wherein the DCI for triggering the retransmission of the first HARQ-ACK sub-codebook comprises a first trigger group number field which is the same as a first scheduling group number field, the first trigger group number field is used to indicate a number of the first trigger group, and the first scheduling group number field is used to indicate a number of the first scheduling group; and
   receiving the first HARQ-ACK sub-codebook retransmitted by the user terminal;

wherein before determining whether the first HARQ-ACK sub-codebook sent by the user terminal is detected, the method further comprises: transmitting to the user terminal DCI for scheduling the first PDSCH set;

wherein the DCI for scheduling the first PDSCH set comprises the first scheduling group number field, a first scheduling group Downlink Assignment Index (DAI) field, a second scheduling group DAI field, and other trigger group number field for indicating a number of other trigger group, wherein the first scheduling group DAI field is used to indicate a sum of Counter-DAI (C-DAI) of the first scheduling group and Total-DAL (T-DAI) of the other trigger group, and the second scheduling group DAI field is used to indicate a sum of T-DAI of the first scheduling group and the T-DAI of the other trigger group.

2. The method according to claim 1, further comprising: receiving a HARQ-ACK sub-codebook generated by the user terminal based on the other trigger group number field.

3. The method according to claim 1, wherein the DCI for triggering the retransmission of the first HARQ-ACK sub-codebook further comprises other scheduling group number field for indicating a number of a scheduling group where other scheduled PDSCH set is located.

4. The method according to claim 3, wherein the DCI for triggering the retransmission of the first HARQ-ACK sub-codebook further comprises a second trigger group DAI field for indicating T-DAI of the first trigger group.

5. The method according to claim 3, wherein the DCI for triggering the retransmission of the first HARQ-ACK sub-codebook further comprises a third trigger group DAI field for indicating a sum of T-DAI of all trigger groups in the DCI for triggering the retransmission of the first HARQ-ACK sub-codebook.

6. A downlink data scheduling HARQ-ACK codebook feedback device comprising a memory and a processor, wherein the memory has computer instructions stored therein, and when the processor executes the computer instructions, the method of claim 1 is performed.

7. A Hybrid Automatic Repeat request-ACKnowledgement (HARQ-ACK) codebook generation method, comprising:

receiving from a base station Downlink Control Information (DCI) for triggering retransmission of a first HARQ-ACK sub-codebook, wherein the DCI for triggering the retransmission of the first HARQ-ACK sub-codebook comprises a first trigger group number field, the first trigger group number field is the same as a first scheduling group number field, the first trigger group number field is used to indicate a number of a first trigger group, and the first scheduling group number field is used to indicate a number of a first scheduling group, the first HARQ-ACK sub-codebook is a feedback generated after receiving a first Physical Downlink Shared CHannel (PDSCH) set which is in the first scheduling group; and based on the DCI for triggering the retransmission of the first HARQ-ACK sub-codebook, generating and transmitting the first HARQ-ACK sub-codebook to the base station;

wherein before receiving from the base station the DCI for triggering the retransmission of the first HARQ-ACK sub-codebook, the method further comprises:

receiving from the base station DCI for scheduling the first PDSCH set;

wherein the DCI for scheduling the first PDSCH set comprises the first scheduling group number field, a first scheduling group Downlink Assignment Index (DAI) field, a second scheduling group DAI field, and other trigger group number field for indicating a number of other trigger group, wherein the first scheduling group DAI field is used to indicate a sum of Counter-DAI (C-DAI) of the first scheduling group and Total-DAI (T-DAI) of the other trigger group, and the second scheduling group DAI field is used to indicate a sum of T-DAI of the first scheduling group and the T-DAI of the other trigger group.

8. The method according to claim 7, wherein the DCI for triggering the retransmission of the first HARQ-ACK sub-codebook further comprises other scheduling group number field for indicating a number of a scheduling group where other scheduled PDSCH set is located.

9. The method according to claim 8, wherein the DCI for triggering the retransmission of the first HARQ-ACK sub-codebook further comprises a second trigger group DAI field for indicating T-DAI of the first trigger group.

10. The method according to claim 8, wherein the DCI for triggering the retransmission of the first HARQ-ACK sub-codebook further comprises a third trigger group DAI field for indicating a sum of T-DAI of all trigger groups in the DCI for triggering the retransmission of the first HARQ-ACK sub-codebook.

11. The method according to claim 7, further comprising:

when a plurality of HARQ-ACK sub-codebooks are transmitted to the base station at a same HARQ-ACK feedback time, sorting the plurality of HARQ-ACK sub-codebooks.

12. The method according to claim 11, wherein sorting the plurality of HARQ-ACK sub-codebooks comprises:

sorting the plurality of HARQ-ACK sub-codebooks based on scheduling group numbers corresponding to the plurality of HARQ-ACK sub-codebooks;

sorting the plurality of HARQ-ACK sub-codebooks based on scheduling time of PDSCH corresponding to the plurality of HARQ-ACK sub-codebooks; or sorting the plurality of HARQ-ACK sub-codebooks based on an order of C-DAI in DCI corresponding to the plurality of HARQ-ACK sub-codebooks.

* * * * *